United States Patent Office 3,288,739
Patented Nov. 29, 1966

3,288,739
PROCESS FOR PREPARING GRAFT COPOLYMERS FROM LINEAR AMORPHOUS NON-CRYSTALLIZABLE POLYMERS OF ALPHA-OLEFINS OR COPOLYMERS OF ALPHA-OLEFINS WITH EACH OTHER AND/OR ETHYLENE
Giulio Natta, Enrico Beati, and Febo Severini, Milan, Italy, assignors to Montecatini Societa Generale per l'Industria Mineraria e Chimica, Milan, Italy, a corporation of Italy
No Drawing. Filed June 26, 1961, Ser. No. 119,285
Claims priority, application Italy, June 30, 1960, 11,632/60
14 Claims. (Cl. 260—29.6)

The present invention relates to a process for preparing graft copolymers.

More particularly the present invention relates to a process for the rapid peroxidation in aqueous suspension of linear amorphous non-crystallizable alpha-olefin polymers or copolymers and to a process carried out in aqueous solution or suspension for producing graft copolymers.

Processes for the peroxidation of amorphous alpha-olefin polymers are known. According to one of these methods the peroxidation reaction is carried out by reacting oxygen, or gases containing molecular oxygen, on polymer solutions in an autoxidable solvent, such as e.g. cumene in the presence of methanol.

The peroxidized polymer is successively isolated by precipitating the crude reaction mixture with methanol and finally purified by dissolving and precipitating it again. It is also known a process for preparing peroxy-derivatives of amorphous polymers without carrying out the peroxidation in solution.

In this process, which is particularly suitable for alpha-olefin polymers prevailingly consisting of macromolecules having isotactic structure, the peroxidation reaction is carried out by reacting an air current, containing very small amount of a volatile peroxidic compound, with the substance in the rather divided solid state, at a temperature lower than 100° C.

From the contemporaneously peroxidized atactic and isotactic polymers mixtures, the amorphous portion in the case of polypropylene and polybutene can be separated from the crystalline one by solvent extraction (e.g., with ether).

The applicants have now surprisingly found that the amorphous non-crystallizable polymers of alpha-olefins can be peroxidized in very short times even in the absence of peroxide compounds as initiators, by reacting a gas containing molecular oxygen with the polymer dispersed or suspended in water, under a pressure comprised between 1 and 20 atm. at temperatures lower than 100° C.

The peroxidized polymers thus obtained are particularly suitable for realizing the graft reaction with monomers polymerizable by a free radical mechanism, by contacting the peroxidized polymer with the monomer to be grafted on, at a temperature comprised between 30° and 100° C.

An object of the present invention is therefore a process for preparing graft copolymers from non-crystallizable linear amorphous polymers of alpha-olefifins or copolymers of alpha-olefins with each other and/or with ethylene, which process is characterized in that an aqueous suspension of said polymers or copolymers is subjected, at a temperature comprised between 40° and 200° C. and under a pressure comprised between 1 and 20 atm., to the action of a gas containing molecular oxygen and successively causing, by action of the peroxidic groups thus formed, the polymerization, in emulsion or solution, of monomers, polymerizable with a radicalic mechanism, and the grafting of the resulting polymeric chains onto the linear chains of the peroxidized polymer.

The peroxidation reaction according to the present invention can be carried out preferably by adding to the dispersing medium, that is to water, a surface-active agent. As the gas containing molecular oxygen, air is preferably used.

The peroxidation process is preferably carried out as follows: the polymer to be peroxidized, in the form of small size granules is placed in a vessel provided with a rotative agitator and containing a surface-active substance, such as, e.g. an alkyl sulfate or an aralkyl sulfonate, dissolved in water.

The mixture is heated to the desired temperature and air or an oxygen-containing gaseous mixture is then introduced.

A pressure increase above the atmospheric pressure reduces the polymerization time. The time required for obtaining the desired peroxidation degree depends on the reaction conditions and on the oxygen partial pressure in the gaseous mixture. In general, for the graft applications to which the products prepared according to the present invention are destined, it is sufficient to fix onto the polymer, in the form of peroxidic or hydroperoxidic groups, an oxygen content comprised between 0.05 and 1% preferably 0.2% this result being reached within very short reaction times.

As amorphous non-crystallizable polymers which can be peroxidized according to the present invention we can mention polypropylene, polybutene, polymethylpentene, polyhexene or their copolymers with ethylene.

Such amorphous polymers preferably have a molecular weight higher than 10,000.

In case amorphous polymers are used which behave at the peroxidation temperature, like high-viscosity liquids, the process according to the present invention, offers various advantages in respect to the prior art, particularly the rapidity and homogeneousness of the reaction taking place also in the absence of foreign substances acting as initiators yielding free radicals.

The peroxidized polymers thus obtained are suitable for the production of graft polymers, and more particularly of their emulsions consisting of a dispersion of a graft copolymer having a polyalphaolefin content comprised between 10% and 60%, preferably, in case of polybutene of 40%.

As radicalic mechanism polymerizable monomers able to be grafted onto the peroxidized polymers, we mention among others, for instance the vinyl-, dienic- or vinylidenic compounds such as styrene, butadiene-1,3, isoprene and vinylidene chloride.

Mixtures of these compounds can also be used successfully.

Thus for instance in case of the production of copolymers consisting of polystyrenes grafted onto polyalphaolefins, the latter, after peroxidation, are treated with monomeric styrene so as to obtain a cake, which after addition of an emulsifier dispersed in water, and eventually of a colloid compound, such as for instance oxyethylcellulose, and then heated in order to decompose the peroxidic groups in free radicals which cause the polymerization and grafting of polystyrene onto the polyalphaolefins.

The following examples illustrate the present invention in one of its preferred embodiment but it is understood that various modifications can be made without departing from the scope of the present invention.

*Example 1*

30 g. of non-crystallizable head-to-tail amorphous polypropylene having an intrinsic viscosity, determined in toluene at 30° C., of 0.89, obtained by ether extraction from the extraction residue of the raw propylene polymerization product obtained according to the process described in Italian Patent No. 537,425, are introduced in the form of granules into a stainless steel autoclave provided with a rotating agitator, together with 600 g. of water containing 3 g. of dissolved commercial sodium lauryl sulfate. The agitator is started and the mixture is heated up to 90° C., air is then pumped into the reactor up to a pressure of 15 atm. After 5 hours the reaction is stopped and the peroxidized polymer floating on the soap solution is separated and purified by carefully washing with water and is then dried, weighed and analyzed in order to determine the oxygen amount fixed in the form of —O—O— groups.

30 g. of dry polymer having a peroxidic oxygen content of 0.40% and an intrinsic viscosity, determined in toluene at 30° C., of 0.46 are thus obtained.

*Example 2*

The process is carried out as described in Example 1, but 30 g. of amorphous non-crystallizable head-to-tail polybutene having an intrinsic viscosity of 0.76, determined in toluene at 30° C., obtained by ether extraction from a residue of the ether extraction of a raw butene-1 polymerization product prepared according to the process described in Italian Patent No. 537,425.

After 1 hour and a half the reaction is stopped and the peroxidized polymer is carefully washed with water, dried and analyzed.

30 g. of dry peroxidized polymer, having a peroxidic oxygen content of 0.38% and an intrinsic viscosity, determined in toluene at 30° C., of 0.38 are obtained.

*Example 3*

By operating as described in Example 2 but in the absence of emulsifier, a dry peroxidized polymer having a peroxidic oxygen content of 0.5% is obtained.

*Example 4*

The process is carried out as described in Example 1, but using 30 g. of an ethylene-propylene copolymer containing 45 mols percent of ethylene and 55 mols of propylene (prepared according to the process described in Italian Patent No. 554,803) and having an intrinsic viscosity [$\eta$], determined in toluene at 75° C. of 2.03. After 2 hours the reaction is stopped and the polymer is carefully washed with water, dried and analyzed.

30 g. of dry peroxidized copolymer, having a peroxidic oxygen content of 0.24% and an intrinsic viscosity, determined in toluene at 30° C., of 0.91, are obtained.

*Example 5*

32 g. of amorphous non-crystallizable polybutene, peroxidized according to the process described in Example 2 and having a peroxidic oxygen content of 0.38% and an intrinsic viscosity, determined in toluene at 30° C., of 0.38, are kept in contact under carbon dioxide for 15 hours at room temperature with 48 g. of styrene.

The mass is then mixed with a glass rod to obtain a homogeneous paste to which 6 g. of a product consisting of a mixture of oxyethylated phenol and sodium alkylarylsulfonate, 0.2 g. of a silicone antifoaming agent and, slowly, 85 g. of deionized water are added while stirring.

The mixture obtained is homogenized by action of an emulsifier for 5 minutes under an inert gas and the emulsion thus obtained is placed in a flask immersed in a Vaseline oil bath and provided with an agitator and a reflux condenser.

The temperature of the bath is left to raise up to 90° C. while keeping the mass under vigorous agitation. After 5 hours, as the graft polymerization reaction is practically complete, the agitation is stopped and 160 g. of a latex containing 50% of polymeric material emulsified in the form of spheric particles having size comprised between 0.1 and 0.05$\mu$ (determined under the electronic microscope) are obtained.

The emulsified polymer containing 60% of polystyrene has an intrinsic viscosity, determined in toluene at 30° C., of 0.89.

The emulsion obtained has no tendency to separation and can be used for the production of paints. When spread as a thin coating on a sheet of e.g., wood, metal or glass, it gives, after evaporation of water, an almost transparent, continuous crack- and fissure-free film.

The emulsions thus prepared can be used for sizing fabrics or for preparing varnishes.

*Example 6*

In a 0.6 litre autoclave are placed 34 g. of an ethylene-propylene copolymer peroxidized according to the process of Example 4 and having an intrinsic viscosity, determined in toluene at 30° C., of 0.9 and a peroxidic oxygen content of 0.24%, swollen with 205 g. of benzene. Air is removed from the reactor by repeated flushing with nitrogen and 190 g. of 1,3-butadiene are introduced. The mixture is heated to 90° C. and after 16 hours the reaction is stopped and 50 cc. benzene containing 1% of phenyl-beta-naphthylamine are introduced into the reactor.

After cooling the reaction mixture is discharged in the form of a gelatinous mass, from which, after precipitation with methanol and drying, 56 g. of a material containing 39.2% of butadiene are obtained.

The polymeric composition thus obtained is treated with a mixture obtained by heating for 20 minutes at 30° C. the following ingredients:

| | Parts by weight |
|---|---|
| Phenyl-beta-naphthylamine | 1 |
| Stearic acid | 2.5 |
| Zinc oxide | 5.0 |
| Diphenylguanidine | 0.1 |
| N-oxydiethylene benzothiazole-2-sulfamide | 0.7 |
| Sulfur | 1.5 |

The vulcanization is carried out at 150° C. for 30 minutes under a pressure of 50 atm.

Tensile tests carried out at 23° C. with a rate of 500 mm./min. gave the following results:

| | |
|---|---|
| Elongation at break, percent | 560 |
| Tensile strength, kg./cm.$^2$ | 23 |

The use of reinforcing fillers makes is possible to obtain vulcanized rubbers having higher hardness and tensile strength.

*Example 7*

30 g. of amorphous non-crystallized polybutene, peroxidized by the process illustrated in Example 2, having a peroxidic oxygen content of 0.32% and an intrinsic viscosity determined in toluene at 30° C. of 0.46%, are kept in contact with 45 g. of styrene for 15 hours at room temperature under nitrogen. The mass is then stirred with a glass rod until a homogeneous paste is obtained to which 121 g. of an aqueous solution containing 7.4 g. of an emulsifier (the emulsifier consists of a mixture containing 66% of octylphenol oxyethylated with 8.5 mols of ethylene oxide, and 34% of triethanolamide dodecylbenzene sulfonate) and 0.3 g. of hydroxy ethyl cellulose as protective colloid. The mixture obtained is homogenized in an emulsifying device for 5 minutes under an inert gas and the emulsion thus obtained, after addition of 0.1 of a siliconic antifoaming agent and 0.144 of triethylene tetramine, is placed in a flask provided with a stirrer, a condenser and a thermometer, which is immersed in a Vaseline oil bath at the temperature of 85° C.

The graft polymerization reaction is carried out under an inert gas, keeping the vigorously agitated mass under a nitrogen pressure of 2–3 cm. of water.

After 2 hours, since the graft polymerization reaction is practically complete, agitation is stopped and 196 g. of a lattice having a dry residue of 42.1% is discharged.

The emulsified polymer containing 60% of polystyrene, has an intrinsic viscosity, determined in toluene at 30° C. of 1.20.

The emulsion obtained has no tendency to settle and, when spread as a thin layer on a sheet, e.g., a glass sheet, after evaporation of water, gives an almost transparent continuous film, free of crack and fissures. The properties of the emulsion and of the non-pigmented film are reported in Tables 1 and 2.

TABLE 1

*Properties of the emulsion*

| | |
|---|---|
| Specific gravity at 20° C. | 1.001 |
| Dry residue | 42.1 |
| pH | 7.8 |
| Colour | White |
| Drying time, minutes | 22 |
| Acceptance of pigments | Good |
| Settling after 15 days (sediment) | None |
| Surface pressure at 23° C. (dyne/cm.) | 32 |
| Size of the emulsified particles | 0.05 to 0.1$\mu$ |

TABLE 2

*Properties of the non-pigmented film*

| | |
|---|---|
| Colour | Slightly opaque. |
| Granularity | None. |
| Resistance to water drops | It does not whiten. |
| Tensile strength kg./cm.$^2$ | 17.5. |
| Elongation at break, percent | 14. |

The emulsion thus prepared can be used for preparing paints, sizing fabrics and in general as means for obtaining films.

Many modifications and variations can be practiced without departing from the scope of the present invention. It is to be understood that it is not intended to limit the scope of the present invention except as defined in the appended claims.

What we claim is:

1. A process for preparing graft copolymers of a linear, amorphous polymeric material selected from the group consisting of homopolymers of higher alpha-olefins, copolymers of higher alpha-olefins with each other and copolymers of higher alpha-olefins with ethylene, which comprises (1) forming an aqueous suspension of said linear, amorphous polymeric material, (2) subjecting said aqueous suspension to the action of a gas containing molecular oxygen while employing a pressure above atmospheric but below 20 atmospheres and a temperature between 40° and 200° C. for a time less than five hours in the absence of peroxide compound initiator, thereby peroxidizing said polymeric material, and (3) polymerizing a monomer, which polymerizes by a free-radical mechanism, onto the linear chains of said peroxidized linear, amorphous polymeric material.

2. The process according to claim 1, wherein said aqueous suspension contains a surface active agent.

3. The process according to claim 1, wherein said peroxidizing step of (2) is conducted at a temperature between 50° and 100° C.

4. The process according to claim 1, wherein said peroxidizing step of (2) is conducted so as to obtain a peroxidized polymer having a peroxidic oxygen content between 0.05 and 2%.

5. The process of claim 1, wherein said linear, amorphous polymeric material is polypropylene.

6. The process of claim 1, wherein said linear, amorphous polymeric material is polybutene-1.

7. The process of claim 1, wherein said linear amorphous polymeric material is a copolymer of propylene and ethylene.

8. The process of claim 1, wherein said linear, amorphous polymeric material has a molecular weight greater than 10,000.

9. A process according to claim 1, wherein said polymerization of (3) is carried out in emulsion at a temperature between 40° and 150° C.

10. A process according to claim 1, wherein said monomer which polymerizes by a free-radical mechanism is selected from the group consisting of monomers containing vinyl, dienic and vinylidenic groups.

11. A latex of a graft copolymer prepared by the process of claim 1, wherein said peroxidized polymeric material is polybutene-1 and wherein said monomer which polymerizes by a free-radical mechanism is styrene.

12. The latex of claim 11, wherein said graft copolymer possesses a polybutene-1 content of from 10 to 60%.

13. Vulcanizable graft copolymers prepared according to claim 1 by the polymerization of butadiene in the presence of a peroxidized ethylene-propylene copolymer.

14. A varnish containing the latex of the graft copolymer of claim 11.

References Cited by the Examiner

UNITED STATES PATENTS

| | | | |
|---|---|---|---|
| 2,837,496 | 6/1958 | Vandenberg | 260—29.6 |
| 3,069,382 | 12/1962 | Nikolov et al. | 260—877 |

MURRAY TILLMAN, *Primary Examiner.*

LEON J. BERCOVITZ, *Examiner.*

H. L. SATZ, W. J. BRIGGS, *Assistant Examiners.*